United States Patent Office 3,061,444
Patented Oct. 30, 1962

3,061,444
INCLUSION COMPOUNDS INCORPORATING
EDIBLE JUICE CONSTITUENTS
William I. Rogers, Cary, and Wilson M. Whaley, Chicago, Ill., assignors to General Foods Corporation, White Plains, N.Y., a corporation of Delaware
No Drawing. Filed Oct. 7, 1960, Ser. No. 61,105
19 Claims. (Cl. 99—140)

This invention relates to complexes, or inclusion compounds, to the preparation of the same, and to edible materials incorporating them.

A major problem in the production of convenience foods lies in the difficulty of retaining in the food certain flavors and/or aromas, which, although they may be present in minor amounts, are none the less important. In fact, capturing and preserving for subsequent use the fresh delightful flavors and aromas of fresh edible juices, such as those of freshly picked fruits, leaves and vegetables, is virtually impossible with present-day commercial techniques. Dried leaves, blanched and frozen leaves, dehydrated and frozen fruits and fruit juices, and the like, have been and are used as substitutes, but they fall considerably short of providing the true freshness of the untreated natural material. These flavors and aromas, or "notes," which are characteristic of many fresh foods, tend to escape, or undergo change, or be lost in some way, before the food is delivered to or used by the consumer so that, in the result, the food lacks its original fresh-tasting character.

It is the purpose of this invention to capture and hold the natural flavor and aroma notes of the juices of fresh leaves, vegetables, fruits, meats, etc., including the volatile constituents thereof, and to provide such flavors and aromas in a form in which they will be readily available for use in a desired environment. More particularly, it is proposed to incorporate in a food complexes of the kind described, in which flavor and/or aroma agents are included, so that when the food is dissolved in water, or chewed, the complexes dissociate, releasing the included agent or agents in amounts noticeable to the taste.

The complexes may be defined as comprising a mixture of a water-soluble complex-forming cyclic dextrin and a water-soluble complex-forming acyclic dextrin, each having molecularly included therein at least one constituent of an edible juice to thereby form a complex. The complexes are prepared by complexing the juice constituents with the cyclic and acyclic dextrins. All of the dextrins may be used in the form of a mixture to produce a mixture of complexes, or less than all the dextrins may be used at any one time to form complexes which may then be mixed with the complexes formed from the balance of the dextrins.

Considering the materials for forming the complexes, the cyclic dextrin may be one or more of a series of cyclic polymers of glucose units joined by alpha, 1,4-glycosidic bonds. More particularly, the series may comprise oligomers having 6, 7, 8, 9 or 10 alpha-D-glucopyranose units. The cyclic dextrin having 6 units is known as the alpha cyclic dextrin or cyclohexaamylose; the 7-unit compound is beta cyclic dextrin or cycloheptaamylose; the 8-unit compound is gamma cyclic dextrin of cycloheptaamylose. Similarly the delta and epsilon dextrins have 9 and 10 units. The cyclic dextrins, also called the Schardinger dextrins, are hollow cylindrical molecules having the property of molecularly including within their lumens or bores a variety of flavors and/or aromas, or edible juice constituents. The resulting complexes, or inclusion compounds, are stable combinations wherein the cyclic dextrin molecule physically envelopes the included molecule. It is thought that the principal forces acting to hold the two molecules together result from the spatial fitting of the molecules, but that secondary electrostatic forces may also tend to hold them together. The cyclic dextrins are soluble in water and in saliva. The gamma dextrin has greater solubility in water than the alpha, which in turn is more soluble than the beta. All are bland in taste and odor, are white in color and have a physical appearance similar to starch.

Turning to the acyclic dextrin, it comprises the product obtained by reacting starch, preferably potato starch, and water in the presence of alpha amylase to an extent that is defined (1) by the cold water solubility of the product and (2) by the color reaction of the product with a dilute aqueous solution of iodine. More particularly, the reaction may be allowed to proceed until a point is reached which lies between that point where the product just becomes soluble in cold water and gives a purple color with iodine to that point where the product is still soluble in cold water but no longer gives any color with iodine. The latter is referred to as the achroic point. The reaction may be carried out at a temperature of about 20 to 75° C., preferably 70° C., and at a pH of 4 to 9, preferably 7. It may be noted that the reaction is stopped by heating the mixture to boiling to destroy the enzyme, which in turn stops the reaction. The reaction product, termed an acyclic dextrin, comprises a heterogeneous mixture of oligoglucans.

Besides potato starch, other useful starches for preparing the acyclic dextrins are tapioca starch, corn starch, amioca starch, wheat starch, sago starch, rice starch, etc. Initially, the starch may be gelatinized or not; if ungelatinized, it will become gelatinized because before it is reacted with water in the presence of alpha amylase, the starch, while suspended in the water, is first heated to 70° C. or above and brought to a gel form. More particularly, the starch can be first suspended in water and the suspension heated to boiling until thinning begins, after which it can be cooked under pressure. However, any known method of dispersing the starch in water can be used.

The acyclic dextrins are thought to be hollow spirally shaped molecules having the property of molecularly including juice constituents within the bore of the spiral. The size of the bore, i.e., its diameter, is considered to be more or less fixed. The resulting complexes, as in the case of the cyclic dextrin complexes, are stable combinations wherein the dextrin molecule physically engulfs the included molecule. In regard to the forces which hold the two molecules together, and in regard to their taste, odor, color, and physical appearance, the complexes are like the cyclic dextrin complexes described above.

In regard to the compounds that may be included by the cyclic and acyclic dextrins, namely, the juice constituents, these may be volatile or not, natural or synthetic, and may comprise part or all of a particular juice. The constituents are further described below, but it may suffice here to say that they are of varying molecular size and are characterized by being more or less susceptible to change, or to escape, or to be lost in some way.

The complexes may be prepared by adding a small amount of juice constituents to an aqueous solution of the dextrins, allowing the mixture to reach a state of equilibrium, and then to remove the water, as by freeze drying, spray drying, or other suitable manner. As will be apparent, the juice constituents are soluble in water at least to an extent to enable them to be included by the dextrins when added to an aqueous solution of the latter.

As indicated, the complexes may be formed by mixing all of the dextrins with all of the constituents of a given juice to produce an over-all mixture of complexes. A number of variations of this procedure are possible. Thus one or more cyclic dextrins may be mixed with all of the juice constituents, the resulting complexes recovered, and the remaining uncomplexed constituents mixed with one or more acyclic dextrins to produce additional complexes which may be combined with those previously recovered. According to another procedure, the last mentioned procedure may be repeated except that the acyclic dextrins may be first mixed with the juice constituents, followed by the cyclic dextrins. In another variation, the juice constituents may be divided into two parts, one more volatile than the other, and one or more acyclic dextrins mixed with the more volatile part, while one or more cyclic dextrins are mixed with the less volatile part, and the resulting complexes are combined.

Regardless of which of the foregoing procedures is adopted to form the complexes, it is apparent that the juice constituents, despite their varying molecular size, can be included in the dextrin molecules, since the latter as a group have bore sizes that will accommodate the various sizes of the juice constituents. Thus, the smaller constituents will be included by the acyclic dextrins, the intermediately sized constituents by the alpha and/or beta cyclic dextrins, and the larger sized constituents by the gamma and larger-bore cyclic dextrins.

Turning now to the particular edible juices, the constituents of which may be included by the dextrins, suitable juices that are contemplated by the invention are those of edible leaves, vegetables, fruits, meat, and other edible materials.

Some useful leaves from which the juices may be obtained are those of mint, spinach, parsley, kale, watercress, chives, mustard greens, collards, onions, cabbage, Brussels sprouts, leek, lettuce, endive, chicory, dandelion, etc. The natural fresh juice of these various leaves may comprise more or less volatile constituents, the more volatile constituents being referred to as the "fleeting notes," or those which volatilize readily or are easily lost or changed, while the less volatile constituents comprise the "body notes." Inclusion of the juice constituents in the dextrin materials is carried out by allowing the dextrins to come into contact with the juice, then lyophilizing the mixture, or spray drying it, or otherwise removing the water. In place of the fresh whole natural juice, there may be used the more volatile portion or portions thereof; such as vacuum or steam aromas or other extracts including water and oil aromas. In the result, the complexes that are formed contain a natural balance of the flavor and/or aroma chemicals found either in the whole juice or a portion of the same. The resulting dried complexes protect the included flavors and aromas against deterioration under adverse storage conditions, volatilization, oxidation, destruction by interaction with other components of the juice, etc.

Besides leaf vegetables, the invention is applicable to the juice of stem vegetables like asparagus, rhubarb, chard, celery; also root vegetables like carrots, turnips, peas, parsley, beets, radish, horse-radish, etc.; also flower vegetables like cauliflower and broccoli; and fruit and seed vegetables like sweet corn, peas, Lima beans, pumpkin, squash, tomato, cucumber, watermelon, etc.

Meat juices comprise a suitable material for inclusion by the dextrins. The resulting inclusion compounds have value in the production of meat substitutes and convenience forms of meat, as illustrated by the heat-and-serve concept. Of interest is the fact that inexpensive protein materials such as fish flour may be improved with respect to taste by the addition of complexes having realistic meat flavors and aromas included therein. The resulting protein product may have a flavor approaching that of expensive meat cuts and may be just as nutritious but cost only a fraction as much.

Fruit juices afford another useful source of flavor and aroma constituents which are includable by the cyclic and acyclic dextrins. The juices may comprise those of apples, tomatoes, pears, peaches, pineapple, grape, etc. Particularly suitable are the citrus fruit juices, with which many problems have been encountered in the past when it was sought to prepare convenience forms of citrus fruit juices, such as frozen juice, dry concentrates, etc. For example, deleterious enzyme reactions have caused loss of cloud, some flavor and aroma constituents have been lost through volatilization, and oxidation to or of terpenoid compounds has been responsible for the production of off-flavors. The problem of enzyme reactions may be overcome by flash pasteurization followed by freezing or by removal of water. By means of such procedure the enzymes are inactivated. Such treatments have a disadvantage in that they involve loss of fresh flavor constituents through volatilization of low-boiling molecules. However, by forming dextrin complexes with the juice constituents, it is possible to heat the dried complexes without volatilizing the low boiling constituents; at the same time, oxidation is prevented. As in the case of the other juices, the cyclic dextrins can entrap body notes of the juice, and the acyclic dextrins entrap the fleeting notes. In this way it is possible to entrap all molecular species of the juice. Of particular interest in this connection is the fact that low-boiling molecules, such as are found in orange water aroma, orange oil aroma and orange peel aroma (noted below), comprise delicate compounds which tend to escape or be changed or lost in some way, whether or not the compounds are present in the whole juice, or in a juice concentrate either frozen or dried, or exist per se. The formation of complexes with these delicate compounds comprises a specially advantageous way of preserving them against loss or change.

The following example illustrates the preparation of several acyclic dextrins.

*Example 1*

One liter of water and 120 gm. of potato starch were stirred in a beaker to effect suspension of the starch in the water and the mixture was heated to boiling with constant agitation. The starch gelatinized at about 75° C. Boiling was continued until the mixture began to thin. The material was transferred to a pressure cooker where it was heated for about 15 minutes at about 120° C. and 15 p.s.i.g., after which it was removed from the cooker and cooled to a constant temperature of 70° C., with agitation, at which temperature it was maintained. Then 144 mg. of an alpha amylase preparation in 5 ml. of water was charged to the gelatinized starch solution. Addition of the enzyme caused extreme thinning of the mixture almost immediately. Digestion of the mixture was continued at 70° C., with agitation, for a total time of 120 minutes, and throughout such period, 6 aliquots of 125 ml. each were taken at elapsed times of 3, 8, 15, 30, 60 and 120 minutes. These aliquots are respectively identified as Nos. 1 to 6, No. 1 being that corresponding to a 3-minute digestion, No. 2 that having an 8-minute digestion, etc. A small portion of each aliquot was mixed with a dilute aqueous solution of iodine for observation of the color. Over the series of aliquots, the colors ranged all the way from purple, for aliquot No. 1, to light tan, for aliquot No. 6, the last-mentioned aliquot being thought to have reached the achroic point. In this connection, the achroic point was considered to be the color obtained by adding an equivalent amount of water not containing acyclic dextrin to the standard amount of iodine solution. The remaining portion of each of these aliquots was brought to the boiling point and allowed to boil for 2 minutes to stop the alpha amylase activity. Each sample was then freeze-dried to produce a white powder. These six powders constituted a wide range of acyclic dextrins.

The proportions of cyclic dextrins to acyclic dextrins are variable and will depend on the proportions of larger-sized to smaller-sized molecules in the mixture of juice constituents being treated. In other words, if the larger molecules predominate, then the proportion of cyclic dextrins in the mixture of dextrins should predominate.

In regard to the proportions of dextrins to juice constituents, these may be stated separately for the cyclic dextrins and the acyclic dextrins. The amount of a cyclic dextrin that is used to prepare a complex, relative to a juice constituent, may vary from a weight ratio of 0.1:1 to 40:1, preferably 5:1 to 20:1. In the complex itself, the amount of included compound present is on the order of about 6 to 15% by weight of complex. More particularly, in a complex having alpha cyclic dextrin, the included compound may be 6 to 10%, usually 8%, and in a complex using beta cyclic dextrin, it may range from 7 to 12%, usually 10%. In complexes having gamma cyclic dextrin, the amount of compound may exceed 12%, ranging from 10 to 14 or 15%. It will be understood, in this connection, that mixtures can be prepared in which the amount of included compound is less than 6%, going down to 1%, or 0.1%, by simply adding cyclic dextrin to a complex. The amount of acyclic dextrin that is used to prepare a complex, relative to a juice constituent, may vary from a weight ratio of 20:1 to 0.3:1, preferably 10:1 to 2:1. In the complex itself, the amount of included compound present is usually on the order of about 5 to 30% by weight of complex. It will be understood that mixtures can be prepared in which the amount of compound is less than 5%, going down to 1%, or 0.1%, by simply adding acyclic dextrin to a complex.

The complexes are water-soluble. They are quite stable, being capable of resisting loss of the included constituents by volatilization at temperatures up to 100° C. while being subjected to a vacuum of 0.5 mm. mercury. They have the taste and odor of the included agents, although the odor may not be as strong as that of the agents per se. However, if the complex is in solution, the odor may be as strong as that of the agents per se. The cyclic and acyclic dextrins do not contribute to any appreciable extent to the taste or odor of the complexes nor, when the complexes are added to an edible material, to the taste and/or plasticity of the material.

The manner in which the complexes are used is illustrated by Examples 2 and 4 below, although it may be stated that they can be added to a variety of edible materials corresponding to those from which the juices were derived.

In this connection, when an edible material incorporating the complexes is dissolved in water, or chewed, the complexes, which at least to some extent are soluble in water and in saliva, dissociate to yield the included compounds. Such solubility of the complexes may vary from that of difficultly soluble complexes to that of appreciably soluble complexes, but in any event the solubility is sufficient so that on dissociation of the dissolved complexes, the released constituents are noticeable to the taste. In other words, when the material is dissolved in water or chewed, some of the solid complexes dissolve until an equilibrium is established between the solid and dissolved complexes, and the dissolved complexes dissociate to yield the included compounds and the dextrins, the latter being without effect on the taste of the included compounds. As the included compounds are consumed or used up or otherwise removed from the environment, additional amounts of dissolved complexes dissociate to form additional amounts of compounds to replace those consumed, and in turn additional amounts of solid complexes dissolve to re-establish the equilibrium with the dissolved complexes. In this way the molecules of juice constituents are released from the complexes in a slow controlled way to provide a substantially even and uniform concentration of constituents over an extended time. Not only is there an extended flavor perception time, but also there is a true flavor character which is substantially that of the constituents.

The following examples may illustrate the preparation and use of the complexes.

*Example 2*

This example illustrates the preparation of complexes of the cyclic and acyclic dextrins with constituents of oranges, including orange peel and orange juice.

Peel aroma, oil aroma and water aroma were prepared from fresh oranges as follows. The oranges were peeled, and the peel was pressed to yield an oil which was recovered. It comprised the peel aroma. The peeled oranges were then squeezed to produce fresh juice which was concentrated by evaporating water therefrom, leaving concentrated juice. The evaporated water entrained volatile, delicate aroma constituents. Upon condensation of the evaporated water and its entrained constituents, a water aroma fraction and an oil-aroma fraction constituted the first portions condensed. The oil-aroma fraction is insoluble in the water-aroma fraction and tends to form a separate layer on top of the water-aroma fraction. The water-aroma fraction can be separated from the oil-aroma fraction by decanting, siphoning, drawing off, centrifuging, or in general by any physical operation which depends upon the insolubility and relatively low density of the oil-aroma fraction.

Ten ml. of the water aroma were then shaken with 1.0 gm. of alpha cyclic dextrin, 0.5 gm. of acyclic dextrin, and 15 ml. of water on a wrist action shaker over a period of four hours, and the resulting solution was lyophilized to produce a mixture of solid complexes. This mixture of complexes was determined to be stable and fresh-smelling even after 5 months' storage in a jar at ambient temperatures. In particular, the flavor profile of the mixture, which refers to the amount or variety of constituents included by the dextrins, was judged to approximate closely that of the original water aroma.

A portion of the foregoing mixture of complexes was then added to an aliquot of the concentrated juices prepared by evaporating water therefrom. The resulting mixture was compared with a control, using taste by expert tasters as the criterion. The control comprised the same concentrated juices to which had been added 0.050 ml. of peel aroma, 0.033 ml. of oil aroma, and 14.0 ml. of water aroma. The complex-containing beverage was judged to have a taste more nearly resembling fresh orange juice than the control.

Another test was run in which a sample containing deflavored dearomatized base plus water aroma complexes (made by means of alpha cyclic dextrin and acyclic dextrin) plus peel oil aroma complex (made from alpha cyclic dextrin) plus oil aroma complex (prepared with alpha cyclic dextrin) plus water was employed. At aroma levels equivalent to those used in the preceding paragraph, this sample was judged by expert tasters to be as good as freshly prepared frozen orange juice.

*Example 3*

This example shows complex formation between the cyclic and acyclic dextrins and mint leaf juice, specifically peppermint oil.

A mixture of 15 ml. of water, 1.5 gm. of alpha cyclic dextrin, 0.6 gm. of acyclic dextrin, and 0.2 ml. of peppermint oil was charged into a flask which was then stoppered and shaken for four hours after which it was frozen and lyophilized to produce a mixture of white solid complexes. This mixture was found to have a taste essentially identical to a 0.003% by weight solution of the original peppermint oil dissolved in water.

*Example 4*

The preparation of the complex of Example 3 was duplicated, except that it was made on a larger scale. A mixture of 140 gm. of alpha cyclic dextrin and 60 gm. of acyclic dextrin was dissolved in a minimum amount of water, and then 40 gm. of peppermint oil (considered to be an excess of two-fold) were added. The mixture was stoppered, shaken for four hours, then frozen and lyophilized. About 145 gm. of complex was obtained, which was a low yield owing to the fact that mechanical losses were encountered in the freeze dryer. The product was taste tested and found to be essentially identical to the original peppermint oil. A sample of the product was incorporated in a chewing gum base, that is, chewing gum having no flavor. When the resulting gum was chewed, it was found to release the peppermint flavor in satisfactory amounts over an extended period of time which was considerably longer than a control piece of chewing gum incorporating peppermint flavor in the conventional way.

As shown by Example 2, a mixture of complexes of alpha cyclic dextrin and acyclic dextrin with water aroma may be added to deflavored dearomatized orange juice or complexes involving water aroma, peel aroma, and oil aroma may be added to the deflavored dearomatized orange juice. Another way of adding complexes to orange juice is to incorporate them in fresh concentrated frozen orange juice, which is known to be fluid in the temperature range of 18 to 25° F. During the canning of the juice, the concentrate is chilled to about 20° F., sealed in a can, after which it is further chilled until the canned concentrate becomes solid at about 0° F. The concentrate is usually maintained and sold in the frozen state. To incorporate the complexes, they may conveniently be added to the concentrated juice just prior to the sealing of the can. They can be added in the dry form as a powder, or as pellets, or encapsulated in some water-soluble protectant such as a thin gelatin capsule. They may also be added in liquid form as a suspension in a small amount of oil, say orange oil, and/or any suitable inert oil. Since the sealing operation takes place in just a few minutes, it is apparent that after the addition of the complexes, very little loss of included constituents can occur through dissociation of the complexes. If some dissociation takes place in the sealed can, any interaction of the dissociated constituents with other components of the frozen concentrated juice is relatively slight because of the low temperature of the system. The complexes may contain water aroma, as in Example 1, or peel aroma, or oil aroma, or any combination thereof.

Another procedure of incorporating complexes in frozen orange juice, in the event the juice is not packaged, is to add them to the juice after freezing.

In a generally similar way the complexes may be added to other frozen juices, whether of fruits, vegetables, or meats. They may be added at an appropriate step in the preparation of fruit-flavored beverages, also canned fruits, vegetables, and meats, and in the preparation of dehydrated or frozen fruits, vegetables, and meats which are put up in suitable packages or containers. The complexes in powdered or other form may be added to the fruit, vegetable, or meat just prior to canning or packaging.

In addition, the complexes may be incorporated in meat extracts such as consommes, bouillon, or gravies as well as dehydrated meats. In gravy mixes, for instance, the complexes can be added in the lipid phase, that is, complexes may be incorporated in a suitable fatty medium which is then added to the gravy product. Furthermore, the application of these complexes is suitable for other lipid systems, whether hydrated or dehydrated, such as those of mayonnaise, salad dressings, peanut butter, gelled materials, and the like. In lipid systems the complexes will protect the included constituents against the deleterious effects of oxidation, volatilization, reaction with other components, etc.

Where a mixture of powdered complexes is used, a portion of the mixture may have a different particle size than another portion. The differently sized particles tend to release the included constituents over different periods of time, an effect which may be desirable in some cases.

It is also possible to provide materials having uncomplexed or free juice constituents in combination with complexed constituents. For example, such a material may have up to 50 or 80% of the total constituents in the form of the free constituents, and the latter may be the same as, or different from, the complexed constituents.

It is to be understood that the invention is not restricted to the foregoing specific details but is capable of obvious variations without departing from its scope.

The following is claimed:

1. A mixture of complexes in dry form comprising a water-soluble complex-forming cyclic dextrin and a water-soluble complex-forming acyclic dextrin each having molecularly included therein at least one constituent of an edible juice having a plurality of different flavor and aroma constituents to thereby form a complex, said complexes being water-soluble, and said constituents being releasable from the complexes on dissolving the latter in water.

2. The mixture of complexes of claim 1 wherein said constituents comprise components of an edible plant juice.

3. The mixture of complexes of claim 1 wherein said constituents comprise components of meat juice.

4. The mixture of complexes of claim 2 wherein said constituents comprise components of vegetable juice.

5. The mixture of complexes of claim 4 wherein said constituents comprise volatile components of vegetable juice.

6. The mixture of complexes of claim 2 wherein said constituents comprise components of leaf juice.

7. The mixture of complexes of claim 6 wherein said constituents comprise volatile components of leaf juice.

8. The mixture of complexes of claim 6 wherein said constituents comprise components of mint leaf juice.

9. The mixture of complexes of claim 2 wherein said constituents comprise components of fruit juice.

10. The mixture of complexes of claim 9 wherein said constituents comprise volatile components of said fruit juice.

11. The mixture of complexes of claim 9 wherein said constituents comprise components of citrus juice.

12. The mixture of complexes of claim 11 wherein said constituents comprise volatile components of citrus juice.

13. A mixture of complexes in dry form comprising a water-soluble complex-forming cyclic dextrin and a water-soluble complex-forming acyclic dextrin each having molecularly included therein at least one constituent of an edible juice having a plurality of different flavor and aroma constituents to thereby form a complex; said acyclic dextrin comprising the product of reacting starch and water in the presence of alpha amylase to a point in the range extending from that point where the starch just becomes soluble in cold water and gives a purple color with iodine to that point where the starch is still soluble in cold water but no longer gives a color with iodine; said complexes being water-soluble, and said constituents being releasable from the complexes on dissolving the latter in water.

14. The mixture of complexes of claim 13 wherein said reaction is carried out at a temperature of 20 to 75° C. and a pH of 4 to 9.

15. An edible material normally characterized by the presence of a plurality of water-soluble flavor and/or aroma constituents at least one of which is volatile, said material incorporating therein the mixture of complexes of claim 1.

16. The edible material of claim 15 wherein said material is in a frozen state.

17. The edible material of claim 15 wherein said material is a lipid.

18. In a chewing gum comprising a chewable gum base and a mint flavor, the improvement wherein said flavor is incorporated in the gum in the form of a mixture of complexes in dry form comprising a water-soluble complex-forming cyclic dextrin and a water-soluble complex-forming acyclic dextrin each having molecularly included therein at least one constituent of mint leaf juice to thereby form a complex; said complexes being dissociable in saliva to form the flavor.

19. The chewing gum of claim 18 wherein said mint leaf juice comprises peppermint oil.

References Cited in the file of this patent

UNITED STATES PATENTS

| | | |
|---|---|---|
| 2,827,452 | Schlenk et al. | Mar. 18, 1958 |
| 2,876,160 | Schoch et al. | Mar. 3, 1959 |

OTHER REFERENCES

"The Carbohydrates" by Pigman, Academic Press Inc., publishers, New York, 1957, pages 681 and 705.